Figure 1:
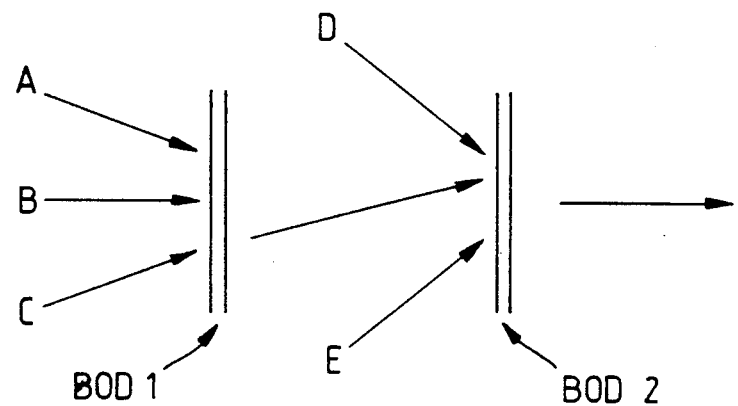

United States Patent [19]

Crossland et al.

[11] Patent Number: 4,992,654
[45] Date of Patent: Feb. 12, 1991

[54] OPTICAL LOGIC DEVICE

[75] Inventors: William A. Crossland, Harlow; Neil Collings, Epping, both of Great Britain

[73] Assignee: STC PLC, London, England

[21] Appl. No.: 227,014

[22] Filed: Aug. 1, 1988

[30] Foreign Application Priority Data

Nov. 4, 1987 [GB] United Kingdom ................ 8725807

[51] Int. Cl.⁵ .................... H01J 31/50; G02F 1/13; G11C 13/04; G02B 6/26
[52] U.S. Cl. .................. 250/213 A; 365/108; 350/347 R; 350/351; 350/96.20
[58] Field of Search ............. 350/96.12, 96.13, 96.18, 350/96.20, 347 R, 347 V, 349, 354, 351; 250/213 A; 365/108, 127

[56] References Cited

U.S. PATENT DOCUMENTS

| | | | |
|---|---|---|---|
| 4,351,589 | 9/1982 | Chavel et al. | 350/342 |
| 4,466,702 | 8/1984 | Wiener-Avnear et al. | 350/347 |
| 4,573,767 | 4/1986 | Jewell | 350/354 |
| 4,720,175 | 1/1988 | Haus et al. | 350/353 |
| 4,783,150 | 11/1988 | Tabony | 350/351 |
| 4,790,634 | 12/1988 | Miller et al. | 350/347 V |

FOREIGN PATENT DOCUMENTS

| | | |
|---|---|---|
| 0256705 | 2/1988 | European Pat. Off. |
| 2178191 | 2/1987 | United Kingdom . |
| 2194071 | 2/1988 | United Kingdom . |

Primary Examiner—Akm Ullah
Attorney, Agent, or Firm—Lee, Mann, Smith, McWilliams & Sweeney

[57] ABSTRACT

An optical logic device consists of a bistable liquid crystal layer (BOD 1) of the thermally-induced birefringent (TIB) type settable by one or more write beams and rfead by a beam of a different wavelength or different light polarization. Thus the read and write beams are optically decoupled. Two such devices (BOD 1 and BOD 2) in tandem form a 3-input AND gate. Here beams A and B are write beams for the first device, (BOD 1), and beam C is the read beam for the first device. For the second device (BOD 2) the write beams are the output of the first device (BOD 1) and beam D, the read beam being beam E. The two read beams have different wavelengths from the write beam. In a second version, the liquid crystal layer is on the base of a prism via which the beams reads it. Write beams go right through the layer, while a read beam is "reflected" from the layer but is modulated by the state thereof. This is an OR gate. Logic assemblies can use combinations of such AND or OR gates.

9 Claims, 1 Drawing Sheet

OPTICAL LOGIC DEVICE

FIELD OF THE INVENTION

The present invention relates to optical logical devices.

BACKGROUND OF THE INVENTION

The conventional approach to making a bistable optical logical device (BOD) is to enclose a non-linear medium in a Fabry-Perot cavity. The cavity is optimized for a particular wavelength at which the non-linearity is strongest. In operating such a device, a holding beam is used to bias the device just below "switch-on". When the device is irradiated with a signal beam, "switch-on" occurs, and the transmission characteristics of the device change. The holding beam and the signal beam are the same wavelength, i.e. that at which the cavity has been optimized.

Such an approach has two limitations. The first limitation is known as critical slowing down. When the holding beam is increased to reduce the intensity of the signal beam needed for "switch-on", there is a critical increase in the time taken to switch the device. The second limitation is that it is not possible to introduce gain into the signal beam except by having a high value of holding beam, which brings the device into the region of critical slow down.

In our British Patent Specification No. 2178191A (W.A Crossland et al 51-17-4) we have described a method for dynamically recording holograms on liquid crystal layers. This involves recording the temperature profile of the hologram by operating the liquid crystal in a regime where its birefringence is sensitive to temperature. Such a device concept is known as thermally induced birefringence (TIB). To increase the sensitivity of the liquid crystal layer, a dye was included which absorbs at the wavelength of the hologram. If the dye is dichroic, i.e if it absorbs preferentially along one axis of the molecule, and has a high order parameter, i.e. it aligns with the liquid crystal director, then it is possible to write and read the hologram with the same wavelength of light. For the read operation the polarization of the interrogation beam is perpendicular to the absorption axis.

SUMMARY OF THE INVENTION

An object of the present invention is to provide an optical logical device in which the disadvantages of known devices of this type are minimised or overcome.

According to the present invention there is provided a bistable optical logic device, in which the logic medium is a liquid crystal layer so arranged as to exploit thermally induced birefringence (TIB), in which the device is maintained in its current condition by a holding light beam so directed as to pass through it, in which the device is switched from its off state to its on state by the application thereto of a signal beam, in which the device is switched from its on state to its off state by a reduction in the intensity of the holding beam, and in which to read the condition of the device a further light beam is applied thereto in such a way as to be decoupled from the light beam used to set the device to its on state, but to be influenced by the state of the device.

As will be seen, there are several ways to effect the above-identified decoupling of the setting (or write) and the reading operations.

PREFERRED EMBODIMENTS OF THE INVENTION

Figure 2:
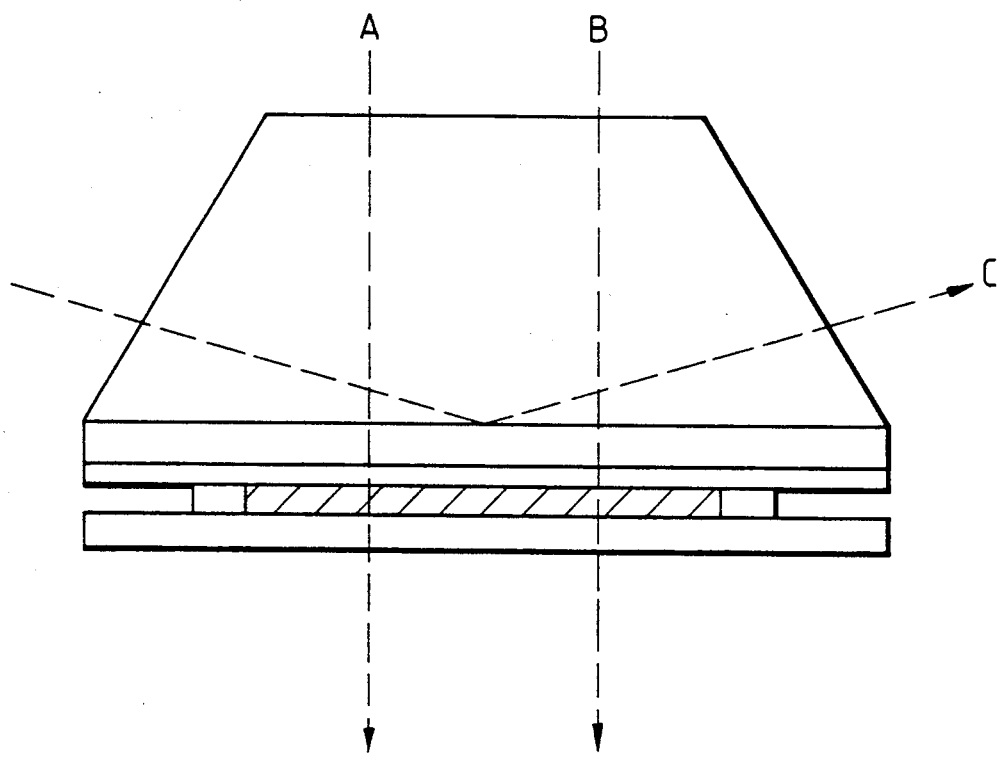

Embodiments of the invention will now be described with reference to the accompanying drawings, in which FIGS. 1 and 2 are highly schematic representations of embodiments of the invention.

The approach on which this invention is based is, as indicated above, to decouple the "write" and "read" operations, and ways to do this include (1) different wavelengths, (2) orthogonal polarisations, and (3) a modified device configuration. At this point we refer to the accompanying highly schematic FIG. 1.

The arrangement of FIG. 1 uses TIB devices in the form of two liquid crystal BOD's 1 and 2 in tandem, with different dyes in the two, which gives a cascadable logic device. Devices BOD 1 and BOD 2 are of the thermally induced birefringent (TIB) type, being thermally biased to a point close to the transition temperature. The devices are preferably in Fabry-Perot cavities, not shown in detail, because this improves the sensitivity of the device. In this arrangement beams A B and E use light of wavelength $\lambda_1$, and beams C and D use wavelengths of $\lambda_2$, which gives a three input AND element. Typical values of $\lambda_1$ and $\lambda_2$ are 514 nm and 632 nm respectively, and typical dyes for use in BOD's 1 and 2 respectively are BDH D2 dye and 1-(4-alkoxyphenylamine)-4-methylamine-anthroquinone. The formula of BDH D2 dye is written as:

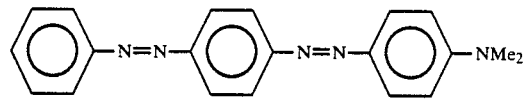

As will be seen, the present arrangement is for the situation in which an array of light intensity values, beam A in FIG. 1, rather than a hologram, is needed. To perform a logic operation a supplementary beam, B, interferes with beam A at the liquid crystal layer, which is mounted in a Fabry-Perot cavity. The resulting array of logic values is interrogated by a read beam, beam C, which can either be a different wavelength to beam A, or of orthogonal polarization with respect thereto.

In the case of the use of orthogonal polarisation, liquid crystal material in a Fabry-Perot cavity (LCFPC) is succeeded by a similar LCFPC, except that the dye alignment is perpendicular to that in the first LCFPC. Hence beam C interferes with beam D and writes a second array of logic values into BOD 2, and these values are interrogated by beam E of orthogonal polarization and we can now return to the original LCFPC.

When an arrangement such as that indicated in FIG. 1 uses different wavelengths, the second LCFPC contains a dye which absorbs beams C and D.

FIG. 2 shows schematically an arrangement with a TIB liquid crystal layer on the bottom of a prism. Hence it is a development of the arrangement described in our British patent specification, No. 2194071A the descriptive content of which is incorporated herein by reference. Here the TIB layer is used to modulate the total internal reflection of beams within the prism, with the write and read functions thus isolated. Thus the above patent specification, No. 2194071A describes how a spatial light modulator can be constructed from an electro-optic modulator without the light penetrating the modulator.

The prism arrangement is a multiple OR gate, i.e. the beam C is modulated when the write beams A and B reach a certain intensity level, and the modulation persists when the number of write beams is increased. The LCFPC, see FIG. 1, is a three-input AND gate. Thus a set of four LCFPC's and a prism TIB device can be combined to form a functional logic block. The prism TIB replaces the second LCFPC, and can be irradiated with the first wavelength, beam E. Two functional blocks can provide any logic function and its complement, while four can provide any interconnection block.

We claim:

1. A bistable optical logic device, which includes a logic medium formed by a layer of a liquid crystal incorporating a dichroic dye so arranged as to exploit thermally induced changes in one or other of the refractive indices of the liquid crystal material, respective means for providing a holding light beam and directing it through the liquid crystal layer, which holding light beam serves to hold the respective device in the off state, respective means for providing a signal beam and directing it to the liquid crystal layer, which signal light beam serves to switch the respective device from the off state to the on state, reduction in the intensity of the holding beam serving to switch the respective device from the on state to the off state, and respective means for providing a further light beam and applying it to the respective device in a manner decoupled from the signal light beam, which further light beam is influenced by the off state of the device and serves to read the condition of the device.

2. A device as claimed in claim 1 and operated by two writing beams whose combined intensity effects said change of state, and the reading beam being of different wavelength light from the write beams.

3. A device as claimed in claim 1 and operated by two writing beams whose combined intensity effects said change of state, and the reading beam being a beam which is orthoginally polarized as compared with the writing beam.

4. A device as claimed in claim 1 and in which the liquid crystal layer is in a Fabry-Perot cavity.

5. An AND logic element consisting of two bistable optical logic devices in tandem, each said device including a respective logic medium formed by a respective layer of a liquid crystal including a respective dichroic dye and so arranged as to exploit thermally induced changes in one or other refractive index of the liquid crystal material, respective means for providing a holding light beam and directing it through the liquid crystal layer, which holding light beam serves to hold the respective device in an off state, respective means for providing a signal light beam and directing it to the liquid crystal layer, which signal light beam serves to switch the respective device from the off state to an on state, reduction in the intensity of the holding beam serving to switch the respective device from the on state to the off state, and respective means for providing a further light beam and applying it to the respective device in a manner decoupled from the signal light beam, which further light beam is influenced by the state of the device and serves to read the condition of the device, wherein for each device the holding light beam and the signal light beams comprise write beams of one wavelength whose combined intensity controls the state of the respective liquid crystal layer and the further light beam is a read beam which is of a different wavelengths to said write beams, wherein for the first device the write beams are beams A and B of a first wavelength and the read beam is a beam C of a second wavelength, and wherein for the second device the write beams are a beam D and an output beam from the first device which are of the second wavelength and the read beam for the second device is a beam E which is of the first wavelength, the decoupling of the read and write beams being achieved by the use of different wavelengths therefor.

6. An AND logic element as claimed in claim 5 wherein the liquid crystal layers are in respective Fabry-Perot cavities.

7. An AND logic element consisting of two bistable optical logic devices in tandem, each said device including a respective logic medium formed by a respective layer of a liquid crystal incorporating a respective dichroic dye and so arranged as to exploit thermally induced changes in one or other refractive index of the liquid crystal material, respective means for providing a holding light beam and directing it though the liquid crystal layer, which holding light beam serves to hold the respective device in an off state, respective means for providing a signal light beam and directing it to the liquid crystal layer, which signal light beam serves to switch the respective device from the off state to an on state, reduction in the intensity of the holding beam serving to switch the respective device from the on state to the off state, and respective means for providing a further light beam and applying it to the respective device in a manner decoupled from the signal light beam, which further light beam is influenced by the state of the device and serves to read the condition of the device, wherein for each device the holding light beam and signal light beam are write beams of one polarisation whose combined intensity controls the state of the respective liquid crystal layer and the further light beam is a read beam which is orthogonally polarised compared with the write beams, wherein for he first device the write beams are beams A and B of a first polarisation and the read beam is a beam C of the orthogonal polarisation to the first polarisation, wherein for the second device the write beams are a beam D and an output beam from the first device which are of said orthogonal polarisation and the read beam for the second device is a beam E which is of the one polarisation, the decoupling of the read and write beams being achieved by the use of different polarisations therefor.

8. An AND logic element as claimed in claim 7 wherein the liquid crystal layers are in respective Fabry-Perot cavities.

9. A bistable optical logic device which includes a logic medium formed by a layer of a liquid crystal incorporating a dichroic dye and so arranged as to exploit thermally induced changes in one or other of the two refractive indices of the liquid crystal material, means for providing a holding light beam and directing it through the liquid crystal layer, which holding light beam serves to hold the device in an off state, means for providing a signal light beam and directing it to the liquid crystal layer, which signal light beam serves to switch the device from the off state to an one state, reduction in the intensity of the holding beam serving to switch the device form the on state to the off state, and means for providing a further light beam and applying it to the device in a manner decoupled from the signal beam, which further light beam is influenced by the state of the device and serves to read the condition of the device, and wherein the liquid crystal layer is formed on the base of a prism through which the light beams are applied, the holding light beam and the signal light beam are write beams which are applied via the prism in such a way as to pass through the liquid crystal layer and to control the state thereof according to their intensities, the further light beam is a read beam which is applied via the prism in such a way as to engage the layer but not to pass through the layer and to be modulated in accordance with the state of the liquid crystal layer set by said write beams, which determines the total internal reflection of the read beam within the prism, thereby achieving said decoupling of the read and write beams.

* * * * *